(12) United States Patent
Zweig et al.

(10) Patent No.: US 11,855,932 B2
(45) Date of Patent: Dec. 26, 2023

(54) METHOD FOR ADJUSTING A DEVICE BEHAVIOR BASED ON PRIVACY CLASSES

(71) Applicant: Intuition Robotics, Ltd., Ramat-Gan (IL)

(72) Inventors: Shay Zweig, Harel (IL); Roy Amir, Ramat Gan (IL); Dor Skuler, Ramat Gan (IL); Itai Mendelsohn, Ramat Gan (IL)

(73) Assignee: INTUITION ROBOTICS, LTD., Ramat-Gan (IL)

( * ) Notice: Subject to any disclaimer, the term of this patent is extended or adjusted under 35 U.S.C. 154(b) by 0 days.

(21) Appl. No.: 16/291,254

(22) Filed: Mar. 4, 2019

(65) Prior Publication Data
US 2019/0273702 A1    Sep. 5, 2019

Related U.S. Application Data

(60) Provisional application No. 62/637,400, filed on Mar. 2, 2018.

(51) Int. Cl.
*H04L 51/02* (2022.01)
*G06N 20/00* (2019.01)
*G06F 21/62* (2013.01)

(52) U.S. Cl.
CPC .......... *H04L 51/02* (2013.01); *G06F 21/6245* (2013.01); *G06N 20/00* (2019.01)

(58) Field of Classification Search
CPC ...... H04L 51/02; G06N 20/00; G06F 21/6245
See application file for complete search history.

(56) References Cited

U.S. PATENT DOCUMENTS

| | | | |
|---|---|---|---|
| 8,583,683 B2 * | 11/2013 | Rathod | G06Q 10/00 707/770 |
| 2006/0293787 A1 | 12/2006 | Kanda et al. | |
| 2007/0199108 A1 | 8/2007 | Angle et al. | |
| 2012/0192247 A1 * | 7/2012 | Oliver | G06F 21/6245 726/1 |
| 2013/0166726 A1 * | 6/2013 | Boldyrev | G06Q 10/10 709/224 |
| 2013/0175816 A1 | 7/2013 | Kawasaki et al. | |
| 2013/0206488 A1 | 8/2013 | Horinouchi | |
| 2013/0268119 A1 | 10/2013 | Weinberg et al. | |

(Continued)

FOREIGN PATENT DOCUMENTS

WO    2015158884 A3    12/2015

OTHER PUBLICATIONS

The International Search Report and the Written Opinion of the International Searching Authority for PCT/US2018/012922, ISA/RU, Moscow, Russia, dated May 31, 2018.

(Continued)

*Primary Examiner* — Anh Nguyen
(74) *Attorney, Agent, or Firm* — M&B IP Analysts, LLC

(57) ABSTRACT

A system and method for adjusting a device behavior with respect to a privacy class. The method includes collecting sensory inputs from a plurality of sensors; analyzing the sensory inputs using at least the sensory inputs and at least a privacy class of a plurality of privacy classes; determining a privacy rule based on the analysis of the sensory inputs; and, initiating an engagement of the user based on the determined privacy rule.

16 Claims, 5 Drawing Sheets

(56) References Cited

U.S. PATENT DOCUMENTS

| | | | |
|---|---|---|---|
| 2013/0326578 A1* | 12/2013 | Blom .................. | G06F 21/6218 |
| | | | 726/1 |
| 2014/0279733 A1 | 9/2014 | Djugash | |
| 2014/0289833 A1* | 9/2014 | Briceno ................ | H04L 63/205 |
| | | | 726/5 |
| 2015/0224640 A1* | 8/2015 | Vu ......................... | G06N 3/008 |
| | | | 901/1 |
| 2016/0260135 A1* | 9/2016 | Zomet ................. | H04L 12/2834 |
| 2016/0311114 A1 | 10/2016 | Herzog et al. | |
| 2017/0243028 A1* | 8/2017 | LaFever .............. | G06F 21/6254 |
| 2020/0311616 A1* | 10/2020 | Rajkumar .............. | G06N 5/043 |

OTHER PUBLICATIONS

International Search Report and Written Opinion of International Searching Authority for PCT/US2019/020494, ISA/RU, Moscow, Russia, dated Jun. 11, 2019.

* cited by examiner

METHOD FOR ADJUSTING A DEVICE BEHAVIOR BASED ON PRIVACY CLASSES

CROSS-REFERENCE TO RELATED APPLICATIONS

This application claims the benefit of U.S. Provisional Application No. 62/637,400 filed on Mar. 2, 2018, the contents of which are hereby incorporated by reference.

TECHNICAL FIELD

The present disclosure relates generally to social robots, and more specifically to a method for adjusting social robot behavior based on privacy classes.

BACKGROUND

Electronic devices, including personal electronic devices such as smartphones, tablet computers, consumer robots, and the like, have been recently designed with ever increasing capabilities. Such capabilities fall within a wide range, including, for example, automatically cleaning or vacuuming a floor, playing high definition video clips, identifying a user by a fingerprint detector, running applications with multiple uses, accessing the internet from various locations, and the like.

In recent years, microelectronics advancement, computer development, control theory development and the availability of electro-mechanical and hydro-mechanical servo-mechanisms, among others, have been key factors in a robotics evolution, giving rise to a new generation of automatons known as social robots. Social robots can conduct what appears to be emotional and cognitive activities, interacting and communicating with people in a simple and pleasant manner following a series of behaviors, patterns and social norms. Advancements in the field of robotics have included the development of biped robots with human appearances that facilitate interaction between the robots and humans by introducing anthropomorphic human traits in the robots. The robots often include a precise mechanical structure allowing for specific physical locomotion and handling skill.

Social robots are autonomous machines that interact with humans by following social behaviors and rules. The capabilities of these social robots have increased over the years and currently social robots are capable of identifying users' behavior patterns, learning users' preferences and reacting accordingly, generating electro-mechanical movements in response to user's touch, user's vocal commands, and so on.

These capabilities enable social robots to be useful in many cases and scenarios, such as interacting with patients that suffer from different issues including autism spectrum disorder, stress, assisting users to initiate variety of computer applications, and the like. Social robots usually use multiple input and output resources, such as microphones, speakers, display units, and the like, to interact with users.

As social robots are usually located in a user's home, e.g., in a bedroom, living room, or kitchen, the robots may be exposed to very intimate moments in person's life. One obstacle of these social robots is that these robots may have difficulty identifying sensitive scenarios at which a person would prefer that the robot would consider the situation and behave in a desired manner. For example, when a person is unclothed, may not want the social robot to be proactive and turn the robot's camera toward their direction, ask questions, suggest watching a movie, and the like. As another example, when the person has company and the robot initiates a reminder to take a certain medication, it may create an embarrassing situation.

Some current solutions enable personalized adaptation of interaction between a user and the social robot. However, a solution that automatically adjusts the social robot's behavior based on sensitive scenarios is still needed. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for adjusting a device behavior with respect to a privacy class, including: collecting sensory inputs from a plurality of sensors; analyzing the sensory inputs using at least the sensory inputs and at least a privacy class of a plurality of privacy classes; determining a privacy rule based on the analysis of the sensory inputs; and, initiating an engagement of the user based on the determined privacy rule.

Certain embodiments disclosed herein also include a non-transitory computer readable medium having stored thereon instructions for causing a processing circuitry to perform a process, the process including: collecting sensory inputs from a plurality of sensors; analyzing the sensory inputs using at least the sensory inputs and at least a privacy class of a plurality of privacy classes; determining a privacy rule based on the analysis of the sensory inputs; and, initiating an engagement of the user based on the determined privacy rule.

Certain embodiments disclosed herein also include a system for adjusting a device behavior with respect to a privacy class, comprising, including: a processing circuitry; and a memory, the memory containing instructions that, when executed by the processing circuitry, configure the system to: collect sensory inputs from a plurality of sensors; analyze the sensory inputs using at least the sensory inputs and at least a privacy class of a plurality of privacy classes; determine a privacy rule based on the analysis of the sensory inputs; and, initiate an engagement of the user based on the determined privacy rule.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
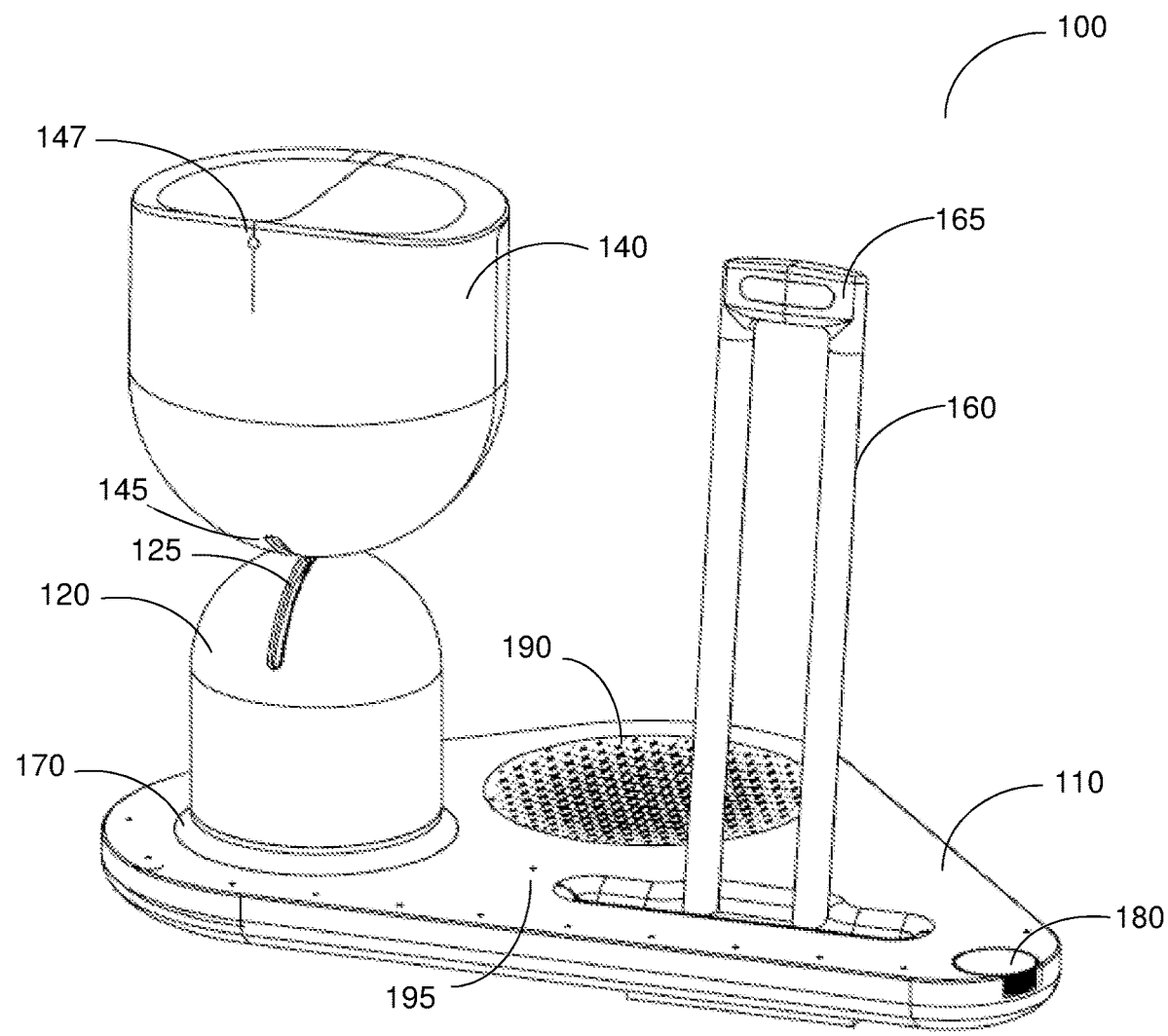
FIG. 1A is a schematic diagram of a device for performing emotional gestures according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for adjusting behavior of a device, such as a social robot, based on privacy classes. The device may be configured to collect sensory inputs with respect to a user who is a target of interaction with the device using sensors embedded within the device. The sensory inputs are analyzed with at least one privacy rule. The result of the analysis is indicative of a current privacy class of the person. After the current privacy class is determined, the device may initiate an engagement with the person based on the current privacy class.

FIG. 1 is an example schematic diagram of a device 100 for performing emotional gestures according to an embodiment. The device 100 may be a social robot, a communication robot, and the like. The device 100 includes a base 110, which may include therein a variety of electronic components, hardware components, and the like. The base 110 may further include a volume control 180, a speaker 190, and a microphone 195.

A first body portion 120 is mounted to the base 110 within a ring 170 designed to accept the first body portion 120 therein. The first body portion 120 may include a hollow hemisphere mounted above a hollow cylinder, although other appropriate bodies and shapes may be used while having a base configured to fit into the ring 170. A first aperture 125 crossing through the apex of the hemisphere of the first body portion 120 provides access into and out of the hollow interior volume of the first body portion 120. The first body portion 120 is mounted to the base 110 within the confinement of the ring 170 such that it may rotate about its vertical axis symmetry, i.e., an axis extending perpendicular from the base. For example, the first body portion 120 rotates clockwise or counterclockwise relative to the base 110. The rotation of the first body portion 120 about the base 110 may be achieved by, for example, a motor (not shown) mounted to the base 110 or a motor (not shown) mounted within the hollow of the first body portion 120.

The device 100 further includes a second body portion 140. The second body portion 140 may additionally include a hollow hemisphere mounted onto a hollow cylindrical portion, although other appropriate bodies may be used. A second aperture 145 is located at the apex of the hemisphere of the second body portion 140. When assembled, the second aperture 145 is positioned to align with the first aperture 125.

The second body portion 140 is mounted to the first body portion 120 by an electro-mechanical member (not shown) placed within the hollow of the first body portion 120 and protruding into the hollow of the second body portion 140 through the first aperture 125 and the second aperture 145.

In an embodiment, the electro-mechanical member enables motion of the second body portion 140 with respect to the first body portion 120 in a motion that imitates at least an emotional gesture understandable to a human user. The combined motion of the second body portion 140 with respect to the first body portion 120 and the first body portion 120 with respect to the base 110 is configured to correspond to one or more of a plurality of predetermined emotional gestures capable of being presented by such movement. A head camera assembly 147 may be embedded within the second body portion 140. The head camera assembly 147 comprises at least one image capturing sensor that allows capturing images and videos.

The base 110 may be further equipped with a stand 160 that is designed to provide support to a user device, such as a portable computing device, e.g., a smartphone. The stand 160 may include two vertical support pillars that may include therein electronic elements. Example for such elements include wires, sensors, charging cables, wireless charging components, and the like and may be configured to communicatively connect the stand to the user device. In an embodiment, a camera assembly 165 is embedded within a top side of the stand 160. The camera assembly 165 includes at least one image capturing sensor.

Figure 1B:
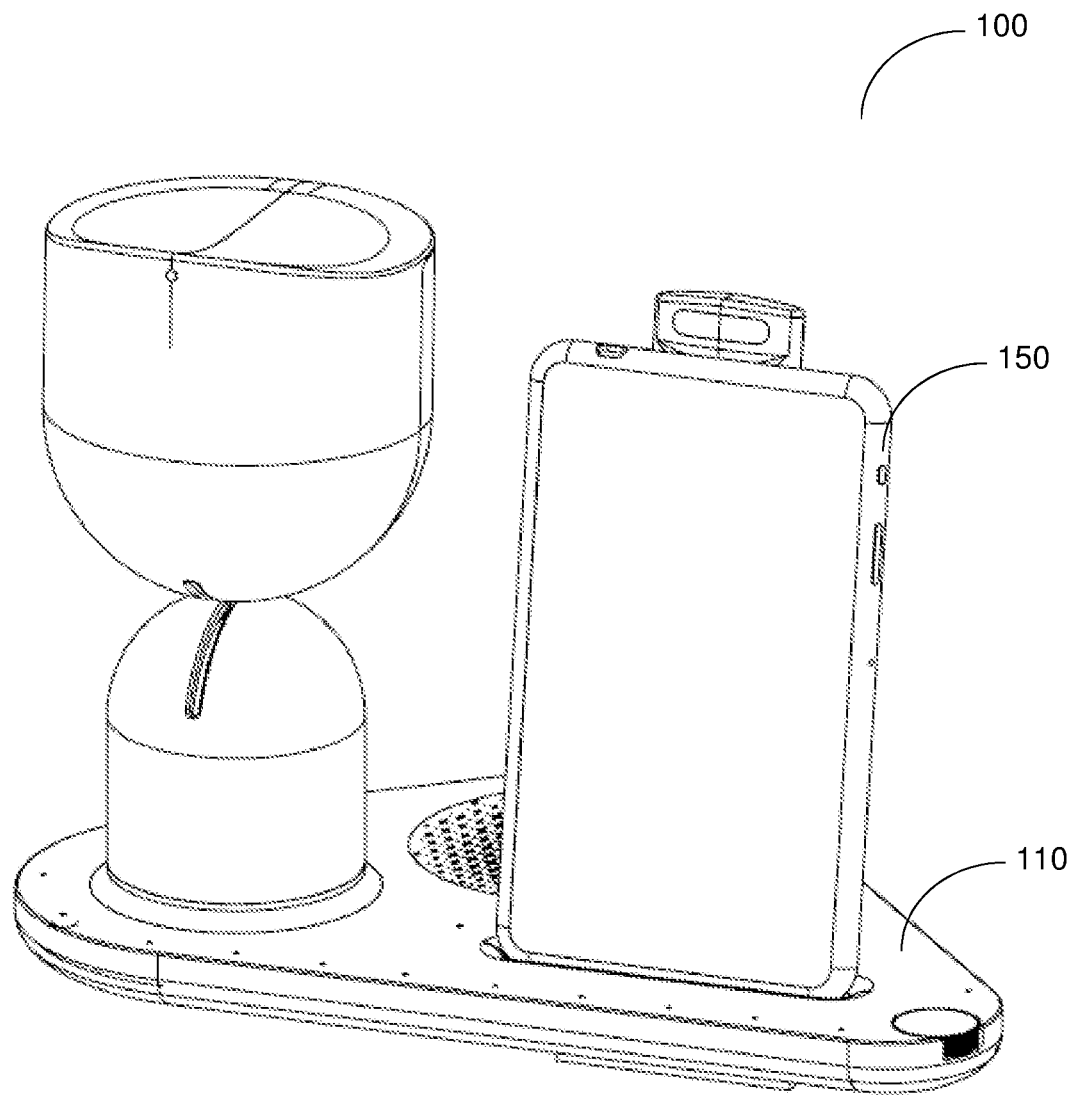
FIG. 1B is a schematic diagram of a device for performing emotional gestures with a user device attached thereto, according to an embodiment.

According to some embodiments, shown in FIG. 1B, a user device 150 is shown supported by the stand 160. The user device 150 may include a portable electronic device including a smartphone, a mobile phone, a tablet computer, a wearable device, and the like. The device 100 is configured to communicate with the user device 150 via a controller (not shown). The user device 150 may further include at least a display unit used to display content, e.g., multimedia. According to an embodiment, the user device 150 may also include sensors, e.g., a camera, a microphone, a light sensor, and the like. The input identified by the sensors of the user device 150 may be relayed to the controller of the device 100 to determine whether one or more electro-mechanical gestures are to be performed.

Returning to FIG. 1A, the device 100 may further include an audio system, including, e.g., a speaker 190. In one embodiment, the speaker 190 is embedded in the base 110. The audio system may be utilized to, for example, play music, make alert sounds, play voice messages, and other audio or audiovisual signals generated by the device 100. The microphone 195, being also part of the audio system, may be adapted to receive voice instructions from a user.

The device 100 may further include an illumination system (not shown). Such a system may be implemented using, for example, one or more light emitting diodes (LEDs). The illumination system may be configured to enable the device 100 to support emotional gestures and relay information to a user, e.g., by blinking or displaying a particular color. For example, an incoming message may be indicated on the device by a LED pulsing green light. The LEDs of the illumination system may be placed on the base 110, on the ring 170, or within on the first or second body portions 120, 140 of the device 100.

Emotional gestures understood by humans are, for example and without limitation, gestures such as: slowly tilting a head downward towards a chest in an expression interpreted as being sorry or ashamed; tilting the head to the left of right towards the shoulder as an expression of posing a question; nodding the head upwards and downwards vigorously as indicating enthusiastic agreement; shaking a head from side to side as indicating disagreement, and so on. A profile of a plurality of emotional gestures may be compiled and used by the device 100.

In an embodiment, the device 100 is configured to relay similar emotional gestures by movements of the first body portion 120 and the second body portion 140 relative to each other and to the base 110. The emotional gestures may be predefined movements that mimic or are similar to certain gestures of humans. Further, the device 100 may be configured to direct the gesture toward a particular individual within a room. For example, for an emotional gesture of expressing agreement towards a particular user who is moving from one side of a room to another, the first body portion 120 may perform movements that track the user, such as a rotation about a vertical axis relative to the base 110, while the second body portion 140 may move upwards and downwards relative to the first body portion 120 to mimic a nodding motion.

An example device 100 discussed herein that may be suitable for use according to at least some of the disclosed embodiments is described further in PCT Application Nos. PCT/US18/12922 and PCT/US18/12923, now pending and assigned to the common assignee.

Figure 2:
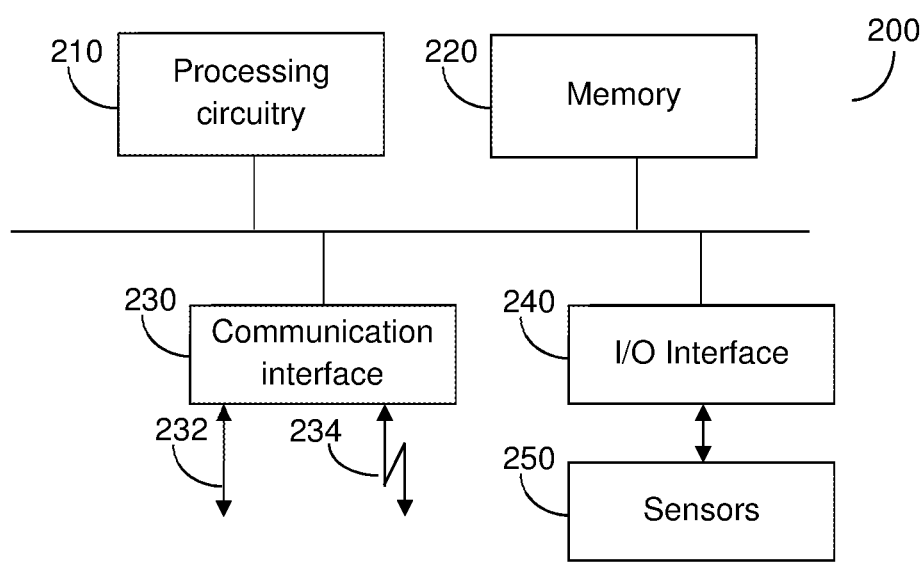
FIG. 2 is a block diagram of a controller for controlling a device for adjusting device behavior based on privacy classes according to an embodiment.

FIG. 2 is an example block diagram of a controller 200 of the device 100 implemented according to an embodiment. In an embodiment, the controller 200 is disposed within the base 110 of the device 100. In another embodiment, the controller 200 is placed within the hollow of the first body portion 120 or the second body portion 140 of the device 100. The controller 200 includes a processing circuitry 210 that is configured to control at least the motion of the various electro-mechanical segments of the device 100.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 200 further includes a memory 220. The memory 220 may contain therein instructions that, when executed by the processing circuitry 210, cause the controller 210 to execute actions, such as, performing a motion of one or more portions of the device 100, receive an input from one or more sensors, display a light pattern, and the like. According to an embodiment, the memory 220 may store therein user information, e.g., data associated with a user's behavior pattern.

The memory 220 is further configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 210 to perform the various processes described herein. Specifically, the instructions, when executed, cause the processing circuitry 210 to cause the first body portion 120, the second body portion 140, and the electro-mechanical member of the device 100 to perform emotional gestures as described herein, including identifying scenarios and actions that correspond with predetermined privacy classes, and reacting accordingly.

In an embodiment, the instructions cause the processing circuitry 210 to execute proactive behavior using the different segments of the device 100 such as initiating recommendations, providing alerts and reminders, etc. using the speaker, the microphone, the user device display, and so on. In a further embodiment, the memory 220 may further include a memory portion (not shown) including the instructions.

The controller 200 further includes a communication interface 230 which is configured to perform wired 232 communications, wireless 234 communications, or both, with external components, such as a wired or wireless network, wired or wireless computing devices, and so on. The communication interface 230 may be configured to communicate with the user device, e.g., a smartphone, to receive data and instructions therefrom.

The controller 200 may further include an input/output (I/O) interface 240 that may be utilized to control the various electronics of the device 100, such as sensors 250, including sensors on the device 100, sensors on the user device 150, the electro-mechanical member, and more. The sensors 250 may include, but are not limited to, environmental sensors, a camera, a microphone, a motion detector, a proximity sensor, a light sensor, a temperature sensor and a touch detector, one of more of which may be configured to sense and identify real-time data associated with a user.

For example, a motion detector may sense movement, and a proximity sensor may detect that the movement is within a predetermined distance to the device 100. As a result, instructions may be sent to light up the illumination system of the device 100 and raise the second body portion 140, mimicking a gesture indicating attention or interest. According to an embodiment, the real-time data may be saved and stored within the device 100, e.g., within the memory 220, and may be used as historical data to assist with identifying behavior patterns, changes occur in behavior patterns, and the like.

As a non-limiting example, the controller 200 may determine, based on analysis of sensory input from a sensor 250, that a certain emotional gesture is appropriate based on identification of a specific behavior of a person who is a target of interaction with the social robot, person's state, number of persons in the person's house, identity of other persons, etc. As a result, the controller 200 may cause the first body portion 120, the electro-mechanical member 130 and the second body portion 140 to perform one or more movements that may be interpreted by the person as one or more emotional gestures. The execution of the movements may also include, for example, emitting voices in order to remind the person to take a medicine, indicate an incoming communication, alerting about drastic changes in the user's bank account, etc. using an appropriate manner considering the collected sensory input, as further described herein below with respect of FIG. 3 and FIG. 4.

Figure 3:
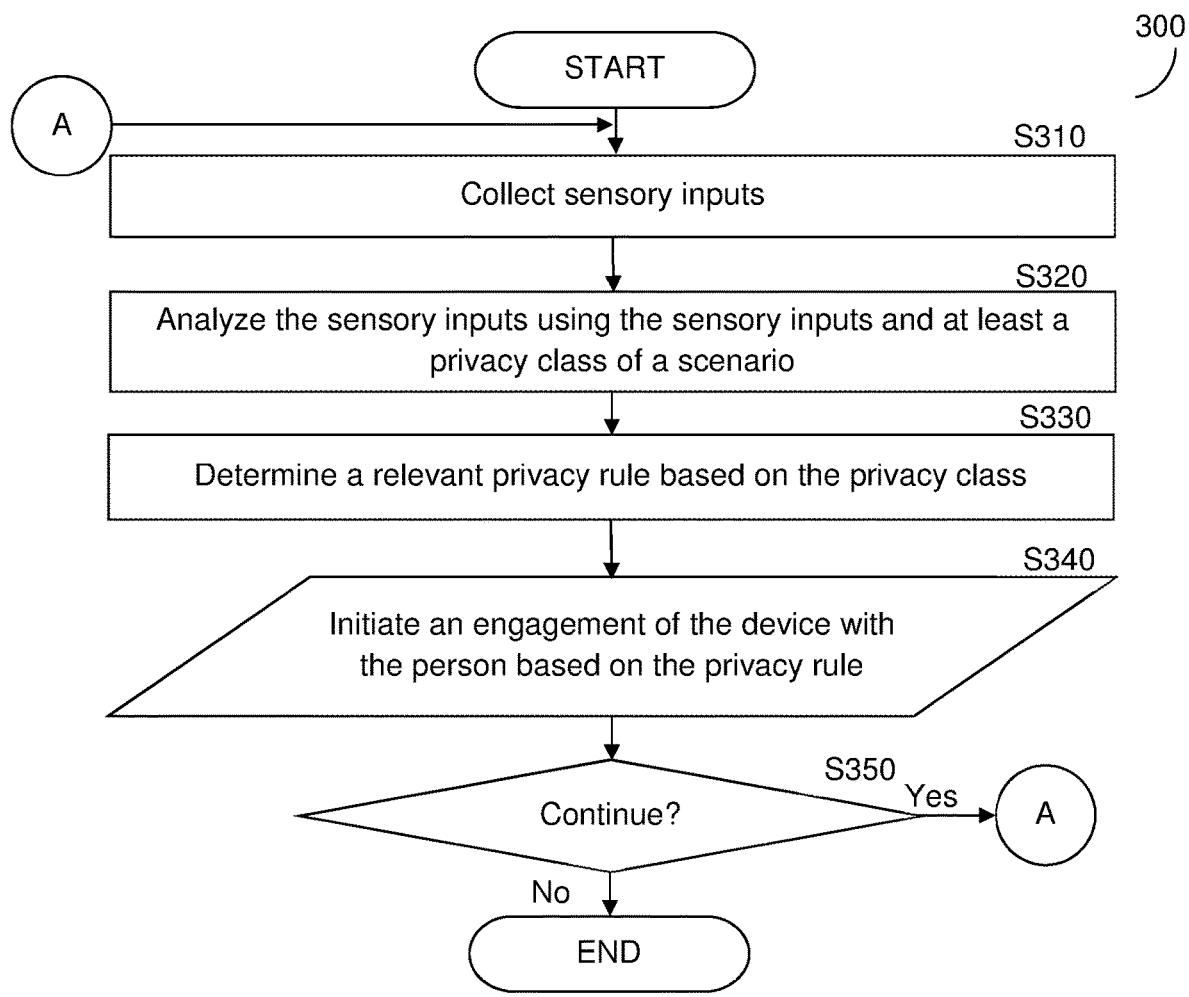
FIG. 3 is a flowchart of a method for adjusting device behavior with respect to a user of the device based on privacy classes according to an embodiment.

FIG. 3 is an example flowchart of a method for adjusting device behavior with respect to a user who is a target of interaction with the device based on at least a privacy rule according to an embodiment.

At S310, sensory inputs are collected, e.g., from at least one of the plurality of sensors of the device that is further described in FIGS. 1 and 2. The sensory inputs are collected with respect to a user who is a target of interaction with the device, such as a registered or previously identified user of the device. As an example, the sensory inputs may record the sound of running water, or the sound of a conversation. According to other examples, the sensory inputs may indicate whether the user is alone or if other individuals are present, the identity of the other individuals, whether the user is unclothed, and so on. These may be based on audio recorded from a microphone, image and video data received from a camera, movement detected by a motion detector, and the like.

At S320, the sensory inputs are analyzed. The analysis may be achieved using at least the sensory inputs and at least a privacy class of a plurality of privacy classes that may be stored in a storage, such as a database, a cloud database, and so on. Privacy classes are categories allowing the device to determine the interpretation of the information gathered from the sensory inputs in terms of the user's privacy. In an embodiment, the privacy classes are predetermined and may be adjusted or modified by a user.

As a non-limited example, the sensory inputs may include a real-time video feed captured by the camera of the device, including an image of an unclothed person. The sensory input is analyzed with respect to privacy classes related to an image of an unclothed person. As an additional example, if the sound of running water is detected in addition to an image of an unclothed person, the privacy class of a shower scenario may be assigned to the current scene.

The privacy class may indicate various levels of sensitivity of a given situation in the context of the person's privacy. Thus, privacy classes may range from low level, such as a scenario with a clothed user who is alone, to a high level, such as a user in a state of undress, or with a group of other people.

As a non-limiting example, a first privacy class may refer to situations at which the user is identified as being unclothed and alone. A second privacy class may refer to situations where the user is clothed and alone. A third privacy class may refer to situations where the user is clothed and with other individuals. Additional privacy classes may refer to situations where a user is clothed and with specific individuals, such as previously identified friends, family members, or caregivers.

According to another embodiment, the privacy class may be identified and determined using machine learning techniques that apply to the collected sensory inputs. That is to say, privacy classes may be determined over time by collecting sensory inputs associated with the user and the user's environment. The analysis may be performed using several techniques such as computer vision techniques, machine learning techniques, video motion detection (VMD), object classification, event classification, and so on.

At S330, a relevant privacy rule is determined based on the privacy class. The privacy rule dictates what activities and actions are to be executed within the various privacy classes, and whether it is desirable to introduce, and the way of introducing, an interaction with the user. The determination of the privacy class and application of the privacy rule are essential in order to engage with the user in a way that will not embarrass them, whether they are alone or other people are present.

For example, the device may be configured to remind a user to take a medication at a specific time of day. At that time, the device is configured to determine, based on received sensory inputs, what the current privacy class is, and if a corresponding privacy rule would allow for such a reminder to be executed. Thus, as an example, if the privacy class indicates that the user is clothed and with another person, and that person is unknown, the privacy class may be on a high privacy level that would prevent a medication reminder from executing, while if the other person is known to be a caregiver such a reminder can be permitted.

Different privacy classes may be used to react differently with regard to different actions in order to protect the user's privacy. For example, referring to the abovementioned first privacy class where the user is alone and unclothed, the device may be allowed to introduce reminders about medicines and notifications regarding the user's bank account, however the generation of small talk with the user may be prohibited.

The determination of the privacy class may include calculating a plurality of parameters such as, whether the person is alone or not, what is the desirable interaction, which entities are allowed to be exposed to such interaction between the device and the person. The parameters may further include the state of the person, whether the person is clothed or not, whether an intimate situation is identified, whether other entities are present in the intimate situation, etc.

It should be noted that these are only examples and there may be many other parameters that may affect the privacy classes. In addition, the privacy classes may be updated with any new identified parameter or a change in permissions.

At S340, an engagement with the user, e.g., via the device, is initiated based on the privacy rule. The engagement may include providing alerts, reminders, recommendations, asking questions, and the like, in a proactive manner or by demand. The way the engagement is executed is affected by the determined privacy rule.

As a non-limiting example, the device receives an important alert regarding the person's bank account and prepares a notification for updating the person. Bank account information may be classified as private information and therefore the device may collect sensory inputs in order to determine if, when, and how to update the person. According to the same example, upon identification that the person's caregiver is in the room together with the person, a certain privacy class is determined, and the generation of the bank notification is postponed.

According to one embodiment, it may be determined to use a straightforward manner to remind the user to take medication when alone, while a more implicit manner will be taken when the user has company. For example, a predetermined codeword may be used to implicitly remind the user to take their medication.

According to another embodiment, the identity of the entity may affect the initiation of the interaction and the way the interaction is executed. Alternatively, when the user has company, it may be determined not to remind the user about the medicine at all, but rather wait until the user will be alone to initiate the reminder, or alternatively to send a reminder to the person's smartphone instead.

It should be noted that even though it may be determined not to remind the user to take medication when various other individuals are in the room, non-private interaction with the user and/or the user's friends may initiated, such as welcoming them, asking for their music preferences, and so on.

According to one embodiment, the execution of the engagement may also include not executing the engagement at all, or not executing the engagement until the analysis of the sensory inputs indicates that the situation allows engaging with the person. At S350, it checked whether to continue the operation and if so, execution continues with S310; otherwise, execution terminates.

Figure 4:
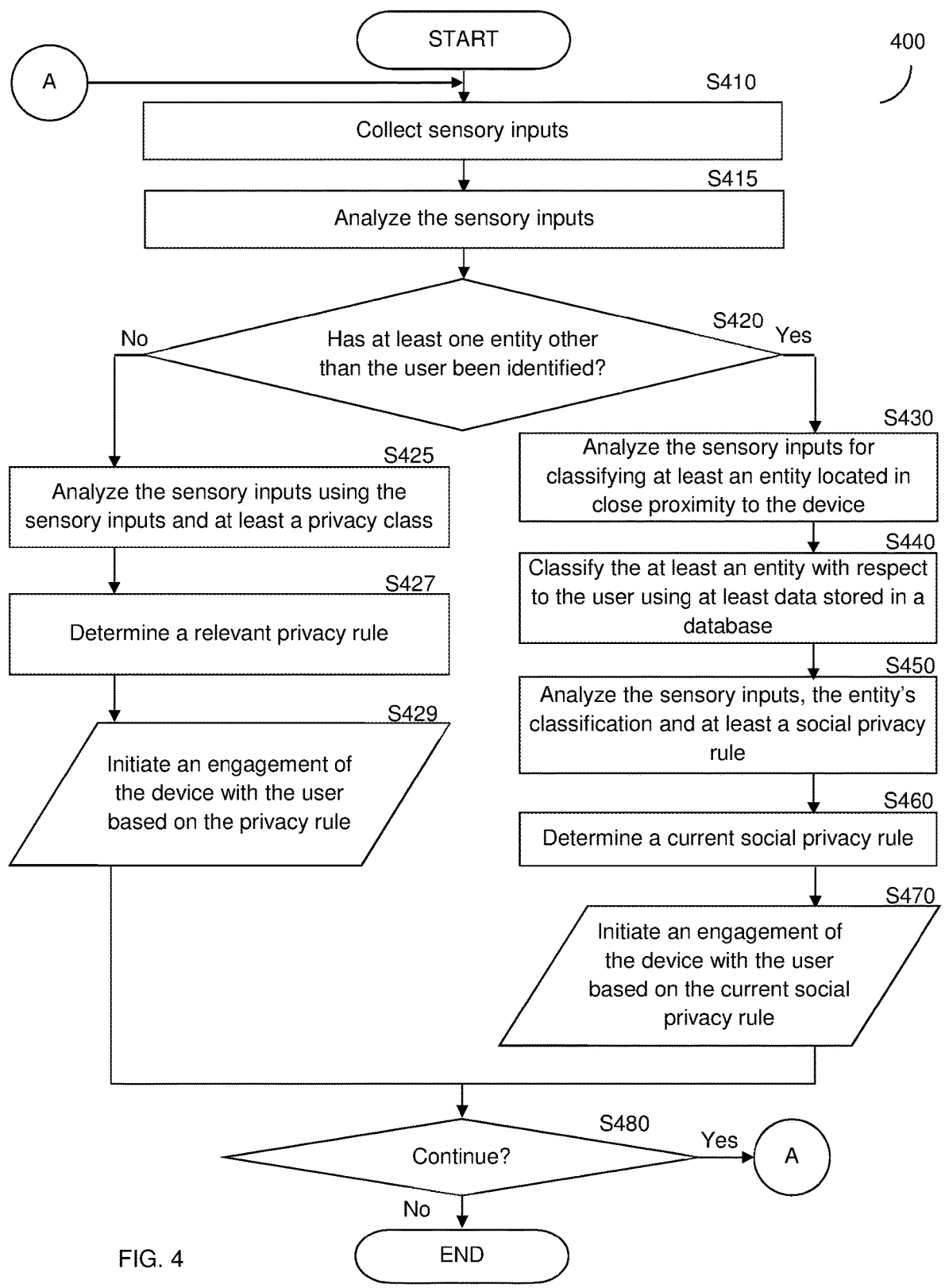
FIG. 4 is a flowchart of a method for adjusting the device behavior based on determination of a social privacy class type according to an embodiment.

FIG. 4 is an example flowchart of a method for adjusting a device behavior based on determination of a privacy class type according to an embodiment. At S410, sensory inputs are collected, e.g., from at least one of the plurality of sensors of the device that is further described in FIGS. 1 and 2. The sensory inputs are collected with respect to a user who is a target of interaction, such as a registered or previously identified user of a device. In an embodiment, the sensory inputs are collected with respect to the person's environment and with respect to other entities located in close proximity to the person.

At S415, the sensory inputs are analyzed. The analysis may be performed using several techniques such as, computer vision techniques, machine learning techniques, video motion detection (VMD), object classification, event classification, and so on.

At S420, it is determined whether at least one entity other than the user is identified within a predetermined distance from the user, e.g. within the user's house, room, three meters from the user, etc. and if so execution continues with S430, otherwise; execution continues with S425. The entity may be for example one or more people, a friend, a stranger, a family member, and so on.

At S430, after determining that at least one other entity is identified within a predefined distance from the user, for example, the user and another person are located within the same room, the sensory inputs are analyzed for enabling classification of the entity. The analysis may include for example, using machine vision techniques to determine the entity's identity.

At S440, the entity is classified with respect to the user. The classification may include comparing the sensory inputs to data stored in a storage. The data may include images, audio records, video clips, and the like of the entity. For example, the data may include one or more images of the person's child as well as a record at which the child's voice can be heard. The results of the comparison may allow for efficient identifying and/or classifying of the entity into one or more categories. The categories may include for example, a family category, friends' category, strangers' category, etc.

At S450, the sensory inputs, the entity's classification and at least a social privacy class of a plurality of social privacy classes are analyzed for determining a social privacy rule. Social privacy classes are guidelines allowing the device to determine the interpretation of the information gathered from the sensory inputs in terms of the person's privacy in social situations. In an embodiment, the social privacy classes may be learned and determined using machine learning techniques that apply on the collected sensory inputs. That is to say, the device may be able to determine social privacy classes over time by collecting sensory inputs associated with the user in the context of other entities that were identified by the device in, e.g. the same room.

For example, if the sensory inputs indicate that the user is in the living room with another person and both of them are watching television together, the other person can be classified as the person's close friend "David" based on image and voice recognition. Thus, at least one corresponding social privacy class is retrieved, e.g., from a storage, and allows for completion of the analysis. The social privacy class may indicate that, for example, if there is a person that is unfamiliar to the device such as a stranger, a high level of privacy should be implemented.

At S460, the current social privacy rule is determined. The social privacy rule may be indicative of what actions may be executed with respect to the sensitivity of the situation in the context of the user's company and the user's privacy.

As a non-limiting example, a first social privacy rule may refer to situations at which execution of a reminder to take a medicine that the person usually takes is about to be generated by the device, however another entity is identified in the room, the entity is identified as the person's caregiver. The first social privacy rule may indicate that the device may not be allowed to introduce reminders about medicines in this kind of situations. According to another example, in case the person is identified as being intimate with a second entity, the current social privacy rule may indicate that only life-saving alerts may be generated by the device.

At S470, an engagement of the device with the person is initiated based on the social privacy rule. The engagement may include providing alerts, reminders, recommendations, asking questions, etc. in a proactive manner or by demand, or, alternatively, refraining from such activities. The way the engagement is executed is influenced by the determined social privacy class.

For example, the device identifies that it is 10 AM and it is time to remind the user to take a certain medicine to be taken every day. However, the sensory inputs indicate that the user's friend "Mia" is in the room. According to the same example, a certain social privacy rule may be determined with respect to the analysis of the sensory inputs. The social privacy rule may indicate that the reminder shall not be generated since the privacy rules state, for example, that the user's friends shall not be exposed to medical reminders. Therefore, the device may postpone the reminder until "Mia" will leave. Alternatively, the device may imply to the user in a way that would not reveal the exact intention of the reminder.

At S480, it checked whether to continue the operation and if so, execution continues with S410; otherwise, execution terminates.

At S425, upon determination that the user is alone the sensory inputs are analyzed using at least the sensory inputs and at least a privacy class of a plurality of privacy classes as further described herein above with respect of FIG. 3.

At S427, an relevant privacy rule is determined based on the result of the analysis. The individual privacy rule may be indicative of the sensitivity of the situation in the context of the engagement between the device and the person when the person is alone. The individual privacy rule may be indicative of different situations such as, whether it is desirable to introduce, and the way of introducing, an interaction with the user. The determination of the individual privacy rule is essential in order to engage with the person in a way that will not embarrass the person.

At S429, an engagement with the user, e.g., via the device, is initiated based on the individual privacy rule. The engagement may include providing alerts, reminders, recommendations, asking questions, etc. in a proactive manner or by demand. For example, a first individual privacy rule may refer to situations at which the person is identified by the device as being alone and unclothed. A second individual privacy rule may refer to situations at which the device is about to generate a reminder, however the device identifies that the person is in an intimate situation.

It should be noted that the abovementioned first and the second individual privacy classes are only examples. In addition, the individual privacy classes may be updated with respect to a learning process at which the device analyze the person's response across time with respect to the device proactive behavior in private situations.

At S480, it checked whether to continue the operation and if so, execution continues with 410; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for adjusting behavior of a social robot with respect to a privacy class, comprising:
    collecting, by the social robot, sensory inputs from a plurality of sensors, wherein the sensory inputs comprising user-related audio data recorded from a microphone, user-related image and video data received from a camera and user-related movements detected by a motion detector;
    analyzing the sensory inputs by the social robot based on a privacy class of a plurality of privacy classes defined within the social robot, the privacy class comprising a category defining how the social robot interprets the sensory inputs in terms of a user's personal privacy in a social situation;
    determining, by the social robot, a privacy rule, defined within the social robot, based on the privacy class and the a nalyzed sensory inputs, the determined privacy rule being indicative of actions that may be executed by the social robot to interact with the user; initiating an engagement of the social robot with the user based on the determined privacy rule;
    wherein the plurality of privacy class includes various levels of privacy classes having various sensitivity levels; and
    wherein initiating an engagement of the user is dependent on a determined sensitivity level.

2. The method of claim 1, wherein the plurality of privacy classes is retrieved from a storage.

3. The method of claim 1, wherein the sensory inputs are collected with respect to the user.

4. The method of claim 1, wherein the sensory inputs are collected with respect to an entity located within a predetermined distance from the user.

5. The method of claim 4, further comprising: analyzing the sensory inputs for classifying the at least an entity.

6. The method of claim 5, further comprising:
    analyzing the sensory inputs, the entity's classification, and the privacy rule.

7. The method of claim 1, wherein the at least a privacy class is determined based on machine learning techniques.

8. A non-transitory computer readable medium having stored thereon instructions for causing a processing circuitry to perform a process for adjusting behavior of a social robot with respect to a privacy class, the process comprising:
    collecting, by the social robot, sensory inputs from a plurality of sensors, wherein the sensory inputs comprising user-related audio data recorded from a microphone, user- related image and video data received from a camera and user-related movements detected by a motion detector;
    analyzing the sensory inputs by the social robot based on a privacy class of a plurality of privacy classes defined within the social robot, the privacy class comprising a category defining how the social robot interprets the sensory inputs in terms of a user's personal privacy in a social situation;
    determining, by the social robot, a privacy rule, defined within the social robot, based on the privacy class and the analyzed sensory inputs, the determined privacy rule being indicative of actions that may be executed by the social robot to interact with the user;
    initiating an engagement of the social robot with the user based on the determined privacy rule;
    wherein the plurality of privacy class includes various levels of privacy classes having various sensitivity levels; and
    wherein initiating an engagement of the user is dependent on a determined sensitivity level.

9. A system for adjusting behavior of a social robot with respect to a privacy class, comprising:
    a processing circuitry of the social robot; and
    a memory, the memory containing instructions that, when executed by the processing circuitry, configure the system to:
    collecting sensory inputs from a plurality of sensors, wherein the sensory inputs comprising:
    user-related audio data recorded from a microphone, user-related image and video data received from a camera and user-related movements detected by a motion detector;
    analyzing the sensory inputs based on a privacy class of a plurality of privacy classes defined within the system, the privacy class comprising a category defining how the social robot interprets the sensory inputs in terms of a user's personal privacy in a social situation;
    determining a privacy rule, defined within the system, based on the privacy class and the analyzed sensory inputs, the determined privacy rule being indicative of actions that may be executed by the social robot to interact with the user;

initiating an engagement of the social robot with the user based on the determined privacy rule;

wherein the plurality of privacy class includes various levels of privacy classes having various sensitivity levels; and wherein initiating an engagement of the user is dependent on a determined sensitivity level.

10. The system of claim 9, wherein the plurality of privacy classes is retrieved from a storage.

11. The system of claim 9, wherein the sensory inputs are collected with respect to the user.

12. The system of claim 9, wherein the sensory inputs are collected with respect to an entity located within a predetermined distance from the user.

13. The system of claim 12, wherein the system is further configured to: analyze the sensory inputs for classifying the at least an entity.

14. The system of claim 13, wherein the system is further configured to: analyze the sensory inputs, the entity's classification, and the privacy rule.

15. The system of claim 9, wherein the at least a privacy class is determined based on machine learning techniques.

16. The method of claim 1, wherein:
the sensory inputs comprise one of visual or audio input;
the privacy class indicates a sensitivity level of the user's personal privacy in the social situation; and
the initiating of the engagement includes providing one of audio or visual alerts based on the determined privacy rule.

* * * * *